UNITED STATES PATENT OFFICE 2,089,697

ELECTRICAL INSULATION AND METHOD OF MAKING THE SAME

Fritz Groebe, Berlin-Reinickendorf-Ost, Germany, assignor to General Electric Company, a corporation of New York No Drawing. Application June 14, 1935, Serial No. 26,701. In Germany June 25, 1934

6 Claims. (Cl. 91—70)

The present invention relates to electrical insulation and method of making the same. More particularly it relates to electrical insulation of the normally inflammable type, such as cotton, linen, paper, or other cellulosic material, and its object is to provide means for rendering such material wholly or partially fire resistant, and preferably also water resistant.

In accordance with my invention material which ordinarily is combustible is impregnated or otherwise associated with a composition comprising as main ingredients urea and phosphoric acid, $H_3PO_4$. Preferably also a resinous material is associated with such a composition, advantageously a resin being chosen which is convertible by heat in the presence of urea and phosphoric acid to an insoluble, infusible state.

The following specific examples illustrate my invention:

Example 1

2.4 kilograms of phosphoric acid, $H_3PO_4$ (84%) are intimately commingled with 3.7 kilograms of urea. This is in the approximate ratio of 3 moles urea to 1 mole phosphoric acid. Preferably, but not necessarily, a resin is added. For example, about 3.0 kilograms of powdered resol resin (a soluble A-stage phenol-formaldehyde resin) may be used. Upon standing in contact with the atmosphere a dry product results. It is dissolved in a suitable solvent, such as alcohol, and preferably in alcohol of the substantially anhydrous state. The above composition may be dissolved in 24 kilograms of alcohol at 40 to 50° C.

The cellulosic material is impregnated with this solution and then is dried. Drying for 15 to 30 minutes at a somewhat elevated temperature, say about 110 to 120° C., is sufficient. During drying the resol resin is converted to the insoluble, infusible condition.

The proportions between the alcohol, the phosphate of urea and the resin must be varied according to the purpose for which the impregnated fiber is intended. Thus, when fiber is impregnated with a solution composed of 80 parts by weight of alcohol, 20 parts by weight of phosphate of urea and 15 parts by weight of resol, the thus treated fiber retains its non-inflammability even after having been treated in flowing water for several hours and having then been dried.

Example 2

1 kg. of 84% phosphoric acid and 1.6 kg. of urea are finely disintegrated and intimately mixed with one another, there being obtained after the mixture has been exposed to the air for a short time, a dry product which then is dissolved in 9.6 kg. of spirit or methanol. Into the clear solution are introduced 1.8 kg. of colophony in small pieces which are dissolved therein with the aid of either a shaking device or a stirring device. There is obtained a light-yellow clear solution with which the respective fiber is soaked, whereafter it is dried at 80° C.

Example 3

Proportions of the amounts of phosphoric acid, urea and alcohol as in the Example 2. Into the clear solution are introduced 1.8 kg. of pulverulent resol, that is to say, hardenable Bakelite in the A-stage, and dissolved therein under stirring. The impregnated fiber is dried for two hours at a temperature of from 115 to 120° C., whereby an impregnated material is obtained, the impregnating agent of which cannot be washed out by water.

Example 4

Proportions of the amounts of phosphoric acid, urea and alcohol as in the Example 1. In the clear solution are dissolved 2 kg. of novo-resin, that is to say, the phenolformaldehyde condensate which does not harden when being melted, and 360 grams of hexamethylentetramine under good stirring, and immediately thereafter the fiber is soaked with the slightly turbid solution obtained. The drying is thereafter effected within 2 hours at 120° C. There is obtained in this way a coating of resin, which coating is distinguished by its particularly good adhering capacity and its impermeability to water.

The composition prepared in accordance with my invention may be used for impregnating fibrous materials and fabrics of various kinds, but its particular utility is for rendering electrical insulation fire resistant and also water resistant. The flame resistant effect of the urea-phosphate composition is produced by the development of non-combustible gases, such as ammonia, nitrogen, and carbon dioxide, which are set free by the effect of heat, also by the formation of fusible phosphoric acid decomposition products, which also are the result of thermal decomposition. The protective effect against moisture is to be ascribed to the resinous portion of the composition which concentrates on the surface of materials impregnated therewith as a definite hydrophobic body. This body has a high molecular weight and forms a cohesive coating insoluble in water on the fibers of the impregnated fabric upon the evaporation of the solvent. As the phosphoric acid is neutralized or reduced in strength no esterification of the cellulosic substance occurs when the solution dries in contact with cellulosic material, even at an elevated drying temperature. Therefore no reduction of strength and flexibility of the fiber results from impregnation with such composition.

What I claim as new and desire to secure by Letters Patent of the United States, is:

1. Method of preparing fire-resisting electrical insulation which comprises impregnating cellulosic material with a composition that comprises the reaction product of phosphoric acid and urea, said reaction product being the resultant of intimately commingling phosphoric acid and urea in the approximate proportion of about 2.4 parts by weight of phosphoric acid of about 84 per cent acid strength to about 3.7 parts by weight of urea.

2. In the art of preparing fire- and water-resisting electrical insulation, the process which comprises impregnating normally inflammable material with a solution of a composition consisting of a phenolic resin which is capable of conversion by heating to an insoluble, infusible state and the resultant of the reaction from intimately commingling phosphoric acid and urea in the approximate proportion of about 2.4 parts by weight of phosphoric acid of about 84 per cent acid strength to about 3.7 parts by weight of urea, and drying the impregnated material at a temperature sufficiently high to evaporate the solvent therefrom and to convert the resin of the starting composition to an insoluble, infusible state.

3. In the art of preparing fire- and water-resisting electrical insulation from material of the normally inflammable type, the process which comprises impregnating cellulosic material with a solution composed of approximately 80 parts by weight of alcohol, approximately 20 parts by weight of phosphate of urea that is the resultant of intimately commingling phosphoric acid and urea in the approximate proportion of about 2.4 parts by weight of phosphoric acid of about 84 per cent acid strength to about 3.7 parts by weight of urea, and in addition thereto, approximately 15 parts by weight of a phenolic resin which is capable of conversion by heating to an insoluble, infusible state, and then subjecting said impregnated cellulosic material to a temperature sufficiently high and for a period of time sufficiently long to evaporate the solvent therefrom and to convert the phenolic resin of the starting composition to an insoluble, infusible state.

4. An article of manufacture comprising cellulosic material impregnated with a composition comprising the product of reacting urea and phosphoric acid in the approximate ratio of 3 moles of the former to 1 mole of the latter.

5. An article of manufacture comprising cellulosic fibers impregnated and coated with a composition consisting of an intimate association of a resin and a substance that comprises the reaction product of phosphoric acid and urea, said reaction product being the resultant of intimately commingling phosphoric acid and urea in the approximate proportion of about 2.4 parts by weight of phosphoric acid of about 84 per cent acid strength to about 3.7 parts by weight of urea.

6. An article of manufacture comprising cellulosic fibers coated with a composition consisting of an intimate association of a phenolic resin which is capable of conversion by heating to an insoluble, infusible state and a substance that comprises the reaction product of phosphoric acid and urea, said reaction product being the resultant of intimately commingling phosphoric acid and urea in the approximate proportion of about 2.4 parts by weight of phosphoric acid of about 84 per cent acid strength to about 3.7 parts by weight of urea.

FRITZ GROEBE.